(12) United States Patent
Pekovic

(10) Patent No.: US 11,718,408 B2
(45) Date of Patent: Aug. 8, 2023

(54) ELECTRIC POWER SYSTEM FOR POWERPLANTS OF A MULTI-ENGINE AIRCRAFT

(71) Applicant: PRATT & WHITNEY CANADA CORP., Longueuil (CA)

(72) Inventor: Tatjana Pekovic, St-Lambert (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 1200 days.

(21) Appl. No.: 16/511,586

(22) Filed: Jul. 15, 2019

(65) Prior Publication Data

US 2020/0307813 A1 Oct. 1, 2020

Related U.S. Application Data

(60) Provisional application No. 62/823,754, filed on Mar. 26, 2019.

(51) Int. Cl.
| | | |
|---|---|---|
| *B64D 27/24* | (2006.01) | |
| *B64D 31/00* | (2006.01) | |
| *B64D 27/10* | (2006.01) | |
| *F02C 6/20* | (2006.01) | |

(52) U.S. Cl.
CPC ............ *B64D 27/24* (2013.01); *B64D 27/10* (2013.01); *B64D 31/00* (2013.01); *F02C 6/20* (2013.01)

(58) Field of Classification Search
CPC ... F02C 6/00; F02C 6/20; F02C 6/206; B64D 27/02; B64D 27/10; B64D 27/24; B64D 31/00; B64D 2027/026; B64D 2221/00
See application file for complete search history.

(56) References Cited

U.S. PATENT DOCUMENTS

| | | | |
|---|---|---|---|
| 9,267,438 B2 | 2/2016 | Dooley et al. | |
| 9,446,842 B2 | 9/2016 | Luyks | |
| 10,151,246 B2 | 12/2018 | Poumarede et al. | |
| 2007/0240415 A1* | 10/2007 | Julien | F02C 6/12 60/39.1 |
| 2014/0333127 A1* | 11/2014 | Edwards | H02J 4/00 307/9.1 |
| 2015/0191252 A1* | 7/2015 | Cline | F02C 9/00 60/39.24 |
| 2017/0327238 A1* | 11/2017 | Roever | B64D 35/08 |
| 2018/0201384 A1* | 7/2018 | Barth | B64D 31/06 |

\* cited by examiner

*Primary Examiner* — Jason H Duger
(74) *Attorney, Agent, or Firm* — Norton Rose Fulbright Canada LLP

(57) ABSTRACT

A multi-engine aircraft that includes two or more powerplants, each including an electric motor, and an electric power system controlling electrical distribution and operatively connected to the electric motors. The electric power system includes primary battery packs operatively connected to the electric motor of a respective one of the two or more powerplants, a reserve battery pack, and a switch interconnecting the reserve battery pack and the electric motors. The reserve battery pack is shared by the electric motors by the switch and configured such that the reserve battery pack provides electric power to a selected one of the electric motors.

16 Claims, 3 Drawing Sheets

ELECTRIC POWER SYSTEM FOR POWERPLANTS OF A MULTI-ENGINE AIRCRAFT

The present application claims priority on U.S. Patent Application No. 62/823,754 filed Mar. 26, 2019, the entire content of which is incorporated herein by reference.

TECHNICAL FIELD

The present invention relates generally to hybrid and electric powerplants for aircrafts, and more particularly to a multi-engine aircraft powerplants.

BACKGROUND

Developments in hybrid and/or electric powerplant architectures for aircrafts continue. In general terms, such aircraft engines include an electric motor that is powered by an electrical system that includes batteries. In order to meet certification requirements for hybrid and/or electric aircraft engines, such powerplants are required to have back-up battery/batteries, should a failure of the electric portion(s) of the powerplant(s) occur during critical moments (e.g. take-off). In the case of multi-engine aircrafts, the addition of such back-up batteries for multiple powerplants represents significant extra weight.

SUMMARY

There is accordingly provided a multi-engine aircraft comprising: two or more powerplants configured for providing motive power to the aircraft, each including an electric motor; and an electric power system controlling electrical distribution and operatively connected to the electric motors, the electric power system including primary battery packs, each operatively connected to the electric motor of a respective one of the two or more powerplants, the electric power system further including a reserve battery pack and a switch interconnecting the reserve battery pack and the electric motors, the reserve battery pack shared by the electric motors by the switch and configured such that the reserve battery pack provides electric power to a selected one of the electric motors.

There is also provided an electric power system for controlling electrical distribution in a multi-engine aircraft, the multi-engine aircraft comprising two or more powerplants each including an electric motor, the electric power system comprising: primary battery packs operatively connected to respective ones of the electric motors, a reserve battery pack, and a switch operatively connected to the reserve battery pack and to the electric motors, the electric power system configured for: detecting a need for supplementary electric power to be supplied to a selected one of the electric motors; and responsive to detecting the need, commanding the switch to provide access to electric power from the reserve battery pack to the selected one of the electric motors.

There is also provided a method of distributing electric power in a multi-engine aircraft having two or more powerplants each having an electric motor, the method comprising: detecting a need for supplementary electric power to be supplied to one of the electric motors; and responsive to detecting said need, commanding a reserve battery pack to supply electrical power to said electric motor.

There is further provided a multi-engine aircraft comprising: a first powerplant and a second powerplant, the first powerplant including a first electric motor, the second powerplant including a second electric motor; and an electric power system controlling electrical distribution to and operatively connected with the first and second electric motors, the electric power system including a first primary battery pack operatively connected to the first electric motor and a second primary battery pack operatively connected to the second electric motor, a reserve battery pack, and a switch operatively connected to the reserve battery pack and the first and second electric motors, the switch operative to provide access to electric power from the reserve battery pack to a selected one of the first and second electric motors.

BRIEF DESCRIPTION OF THE DRAWINGS

Reference is now made to the accompanying figures in which.

DETAILED DESCRIPTION

The present disclosure is directed to a multi-engine aircraft 1. The multi-engine aircraft 1 includes two or more powerplants 10 including an electric motor 30, and an electric power system 40, each of which is described in more detail below.

Figure 1:
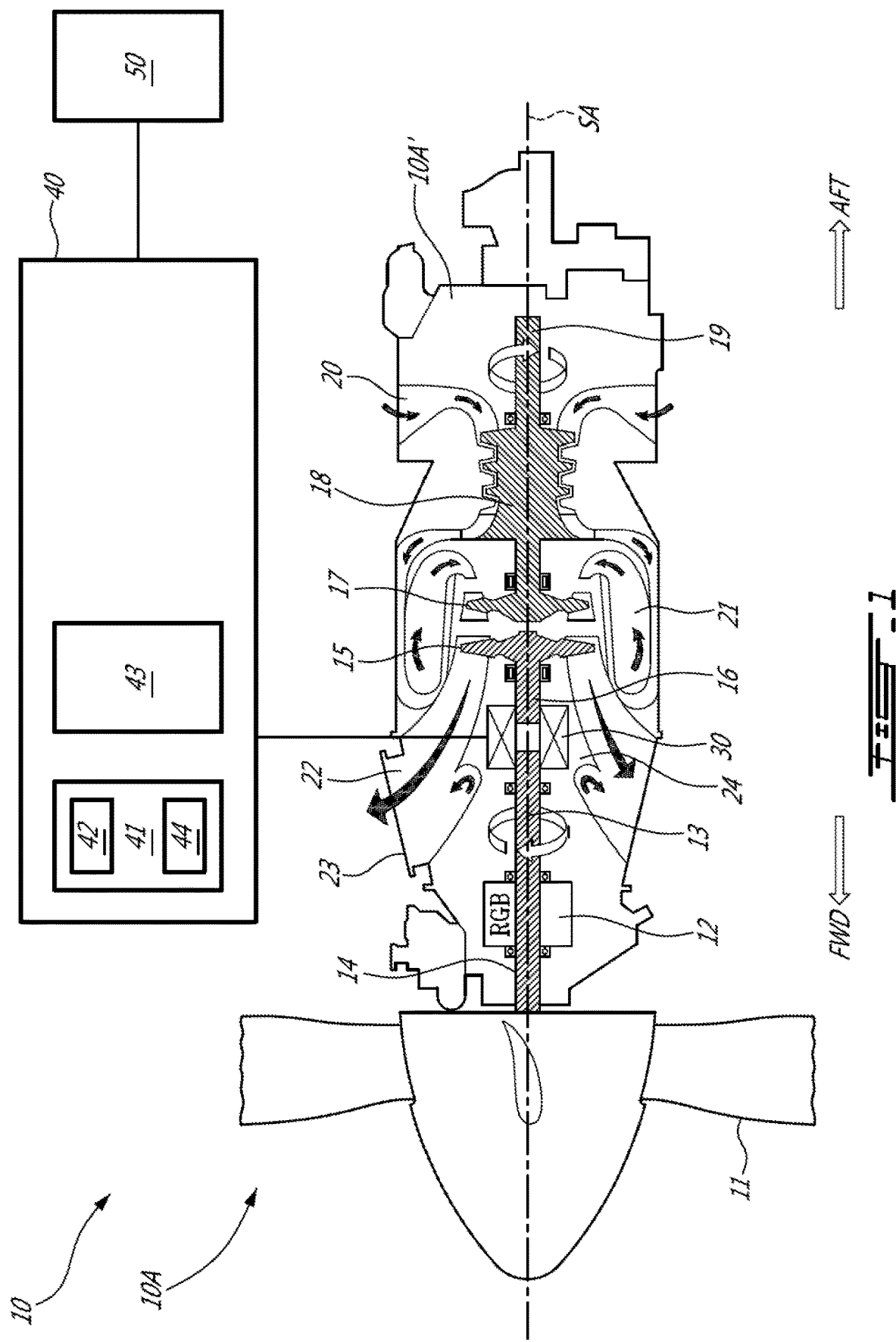
FIG. 1 is a schematic axial cross-section view of an exemplary powerplant shown as a hybrid gas/electric multi-spool turboprop turbine engine.

An example of powerplant 10 is shown in FIG. 1, which is a schematic exemplary representation of an axial cross-section view of a hybrid-electric powerplant 10A, more particularly in this example a hybrid gas/electric multi-spool turboprop turbine engine 10A (or simply "hybrid turbine engine" 10A). Even though the following description and accompanying drawings specifically refer to a turboprop turbine engine as an example, it is understood that aspects of the present disclosure may be equally applicable to other types of powerplants 10 such as turboshaft turbine engines, for instance.

In the depicted embodiment, the hybrid-electric powerplant 10A, in this case the hybrid turbine engine 10A, has a combustion engine 10' (or said differently a combustion engine 10' portion) and is of a type preferably provided for use in subsonic flight to drive a load such as a propeller 11 via a reduction gear box 12 (referred hereinafter as "RGB 12"). The RGB 12 is configured to transfer motive power from a gearbox input shaft 13 to an output shaft 14 coupled to propeller 11. The RGB 12 may be of the speed-reducing type so that the gearbox output shaft 14 may rotate at a rotational speed lower than a rotational speed of the gearbox input shaft 13 and so that the propeller 11 may be driven by the output shaft 14 at a suitable speed. A power turbine 15 may provide rotational motive power to drive the propeller 11 via a turbine shaft 16 (i.e., low pressure shaft), the gearbox input shaft 13, the RGB 12 and the gearbox output shaft 14. In the depicted embodiment, the hybrid turbine engine 10A comprises a first spool comprising a high pressure turbine 17, a high pressure compressor 18 and a high pressure shaft 19, and, a second spool comprising a low pressure power turbine 15 mounted to a power turbine shaft 16.

The power turbine shaft 16 has a shaft axis of rotation SA. In some embodiments, the shaft axis of rotation SA may correspond to a longitudinal axis (e.g., central axis) of the hybrid turbine engine 10A. In some embodiments, the shaft axis of rotation SA may correspond to an axis of rotation of the propeller 11 and/or shaft axis of rotation SA may correspond to an axis of rotation of a low-pressure spool and/or a high-pressure spool of the hybrid turbine engine 10A.

The compressor 18 draws ambient air into the engine 10A via air inlet(s) 20, increases the pressure of the drawn air and deliver the pressurized air to a combustor 21 where the pressurized air is mixed with fuel and ignited for generating an annular stream of hot combustion gas(es) (referred hereinafter in the singular). The high pressure turbine 17 extracts energy from the hot expanding combustion gas and thereby drive the high pressure compressor 18. The hot combustion gas leaving high pressure turbine 17 may be accelerated as it further expands, flows through and drives the power turbine 15. The combustion gas may then exit the hybrid turbine engine 10A via exhaust outlet(s) 22 defined by exhaust duct(s) 23.

The first and second spools of the hybrid turbine engine 10A may not be mechanically coupled together so that they may rotate at different speeds and/or in opposite directions. Also, as shown, the air flow through the hybrid turbine engine 10A is generally toward a forward direction (see "FWD" shown in FIG. 1) of the hybrid turbine engine 10A where air inlet(s) 20 is disposed in a portion of the hybrid turbine engine 10A aft (see "AFT" shown in FIG. 1) of the combustor 21 and exhaust outlet(s) 22 is disposed in a portion of the hybrid turbine engine 10A forward of the combustor 21. The FWD direction illustrated in FIG. 1 may correspond to a direction of travel of the hybrid turbine engine 10A when the hybrid turbine engine 10A is mounted to an aircraft and configured as a turboprop engine. The exemplary configuration of the hybrid turbine engine 10A shown in FIG. 1 may be referred to as a reverse-flow free turbine engine in relation to the general flow direction (in the FWD direction) in the gas path during gas operation of the hybrid turbine engine 10A.

Figure 2:
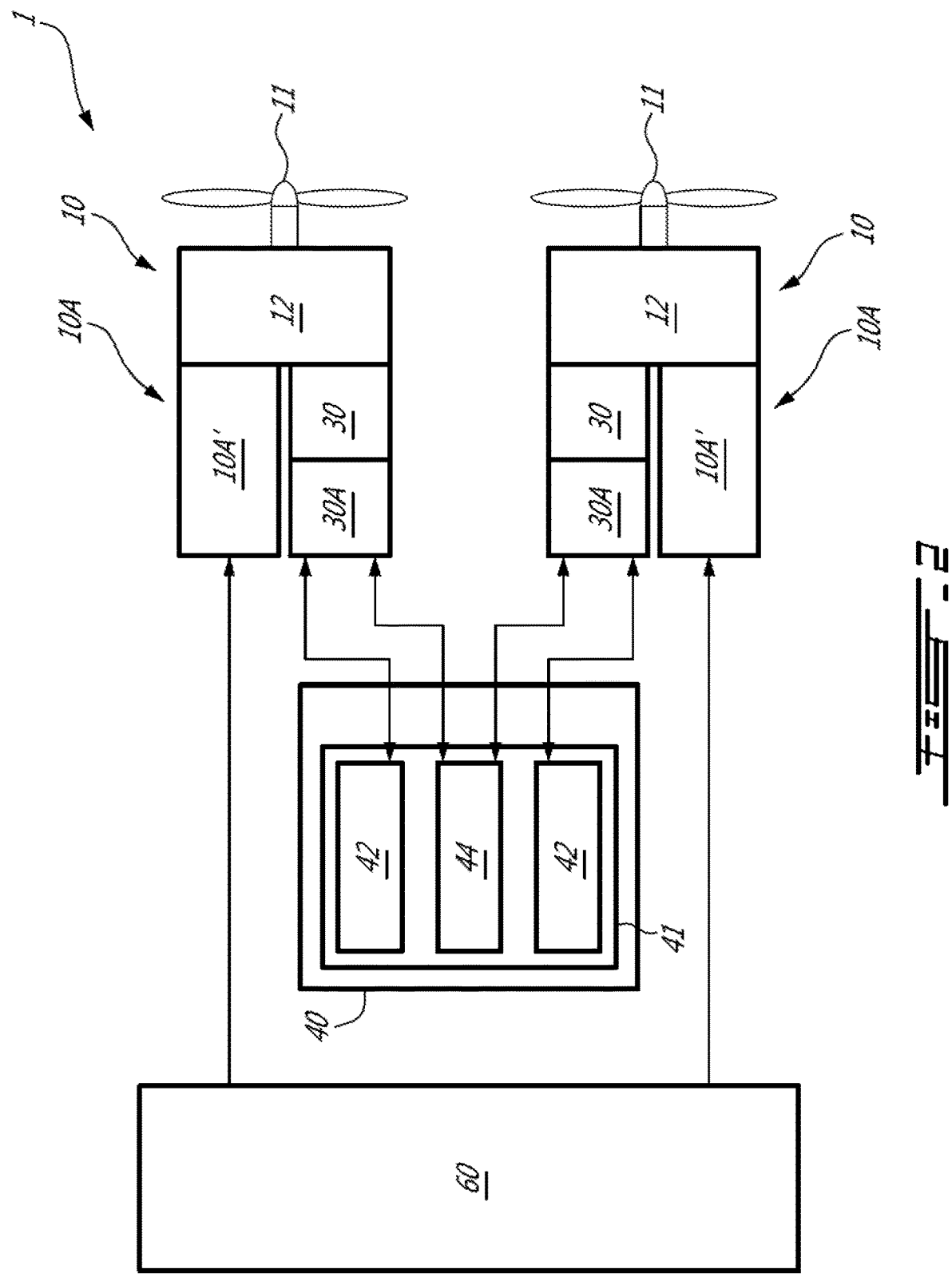
FIG. 2 is a schematic representation of an exemplary multi-engine aircraft with two powerplants such as that shown in FIG. 1.

As seen in FIGS. 1 and 2, the hybrid-electric powerplant 10A, in this case a hybrid turbine engine 10A as discussed above, comprises an electric motor 30, which may have a motor drive 30A (FIG. 2), operatively interfacing with the electric motor 30 and one or more components of the electric power system 40. The electric motor 30 is configured to transfer motive power to the load (e.g., propeller 11) coupled to the hybrid turbine engine 10A. In other words, the hybrid-electric powerplant 10 includes a combustion engine 10A', which in the depicted embodiment is a turbine engine 10A' of the type of a turboprop turbine engine, and an electric motor 30, which may thus together be referred to as a hybrid turbine engine 10, where the gas turbine combustion engine 10A' and the electric motor 30 are drivingly engaged to a common load. The combustion engine 10A' portion of the hybrid-electric powerplant 10A performs the function of the engine control and propeller blade angle modulation and associated protective and indication functions. In the depicted embodiment, the electric motor 30 is at least partially disposed in the radially-inner space 24 defined by the exterior of the exhaust duct 23 and radially converging in the aft direction as indicated in FIG. 1. As shown, in this embodiment, the electric motor 30 is disposed axially between the RGB 12 and the power turbine 15 along the shaft axis of rotation SA. The electric motor 30 may be disposed somewhere else in other embodiments.

In an embodiment, the electric motor 30 is selected to be sufficiently powerful to drive the propeller 11 either without using fuel in the combustion engine 10A' or with using a reduced amount of fuel by the combustion engine 10A' during at least one mode of operation of the hybrid-electric powerplant 10A. The electric portion of the hybrid-electric powerplant 10A may thus assist in power increase for the combustion engine 10A' portion, or provide full power to drive the propeller 11, without using fuel, depending on the embodiment.

In the depicted embodiment, electric power for driving the electric motor 30 is distributed by the electric power system 40. The electric power system 40 controls the electrical distribution and is operatively connected to the electric motor 30. The electric power system 40 includes an electric power source 41, which in the embodiment shown includes a primary battery pack 42. The primary battery pack 42 (or simply "battery back" hereinbelow) is operatively connected to the electric motor 30. The electric power source 41 may have more than one battery packs 42 in some embodiments. For instance, in an alternate embodiment, the hybrid-electric powerplant 10A has more than one electric motor 30 coupled to the combustion engine 10A', and each one of the electric motors 30 of the hybrid-electric powerplant 10A has a respective battery pack 42 operatively connected thereto. The electric power source 41 also includes a reserve battery pack 44, as will be described in further detail below.

The battery packs (42, 44) may be any suitable type of battery, and although each illustrated as a singular battery, may be composed of any suitable number of batteries. In some other embodiments, the battery packs (42, 44) may be a supercapacitor, a fuel cell, or other device for storing electrical energy or using which electrical energy may be produced.

In a particular embodiment, the battery pack(s) 42 are rechargeable, such that during operation of the hybrid-electric powerplant 10A, one or more electric motors 30 may operate as generators to recharge the battery pack(s) 42, when the hybrid-electric powerplant 10A is in a mode of operation where no power is required from the electric motors 30 on the load driven by the hybrid-electric powerplant 10A. The combustion engine 10A' of the hybrid-electric powerplant 10A may also recharge the battery pack(s) 42 in a mode of operation of the hybrid-electric powerplant 10A. For instance, in an embodiment, a generator is operatively connected to the combustion engine 10A', such that power generated from said combustion engine 10A' may be supplied to the generator for then charging the battery pack(s) 42. Alternately, the battery pack(s) 42 may be recharged via a separate generator, not operatively connected to the combustion engine 10A', such as a dedicated generator for charging the battery pack(s) 42, or a dedicated generator associated with each battery pack 42. The multi-engine aircraft 1 may thus have a number of generators each operatively connected to a respective one of the battery packs 42. In an alternate embodiment, the electric power source 41 includes, for example, an auxiliary power unit (APU) for providing a source of electrical power to the aircraft or a pneumatic power for cabin air inside the aircraft or for recharging the battery pack(s) 42, and/or an electric generator from another powerplant 10 which may also be mounted to the aircraft.

The electric power system 40 includes a controller 43 configured to control the operation of the electric motor 30 by providing suitable control signals to the electric motor 30 and/or providing suitable conditioning of the electric power supplied to the electric motor 30 by the electric power source 41. In some embodiments, the electric power system 40, via its controller 43 or otherwise, is configured to control the operation of the electric motor 30 when the electric motor 30 operates as a generator (e.g., to recharge the battery pack 42) in at least one mode of operation of the hybrid-electric powerplant 10. In other words, the electric motor 30 may be operating as a motor or as a generator, depending on the mode of operation of the hybrid-electric powerplant 10. The electric motor 30 operating as a generator for at least one of the battery pack(s) 42 may charge the pack 42 associated therewith, or the electric motor 30 may charge the pack 42 associated with another one of the electric motors 30 of the same or another powerplant 10. In an embodiment where the multi-engine aircraft 1 has at least one generator (separate from the electric motor(s) 30), the electric power system 40, via its controller 43 or otherwise, is configured to command the generator(s) to charge the battery pack 42 of the powerplant 10, or the battery pack 42 of each one of the powerplant 10. The controller 43 may actuate the amount of electric power supplied to the electrical motor 30 in response to control signals it receives, such as for example, commands sent via a control interface (e.g., panel) 50 from a pilot of an aircraft to which the powerplant 10 is mounted.

Figure 3:
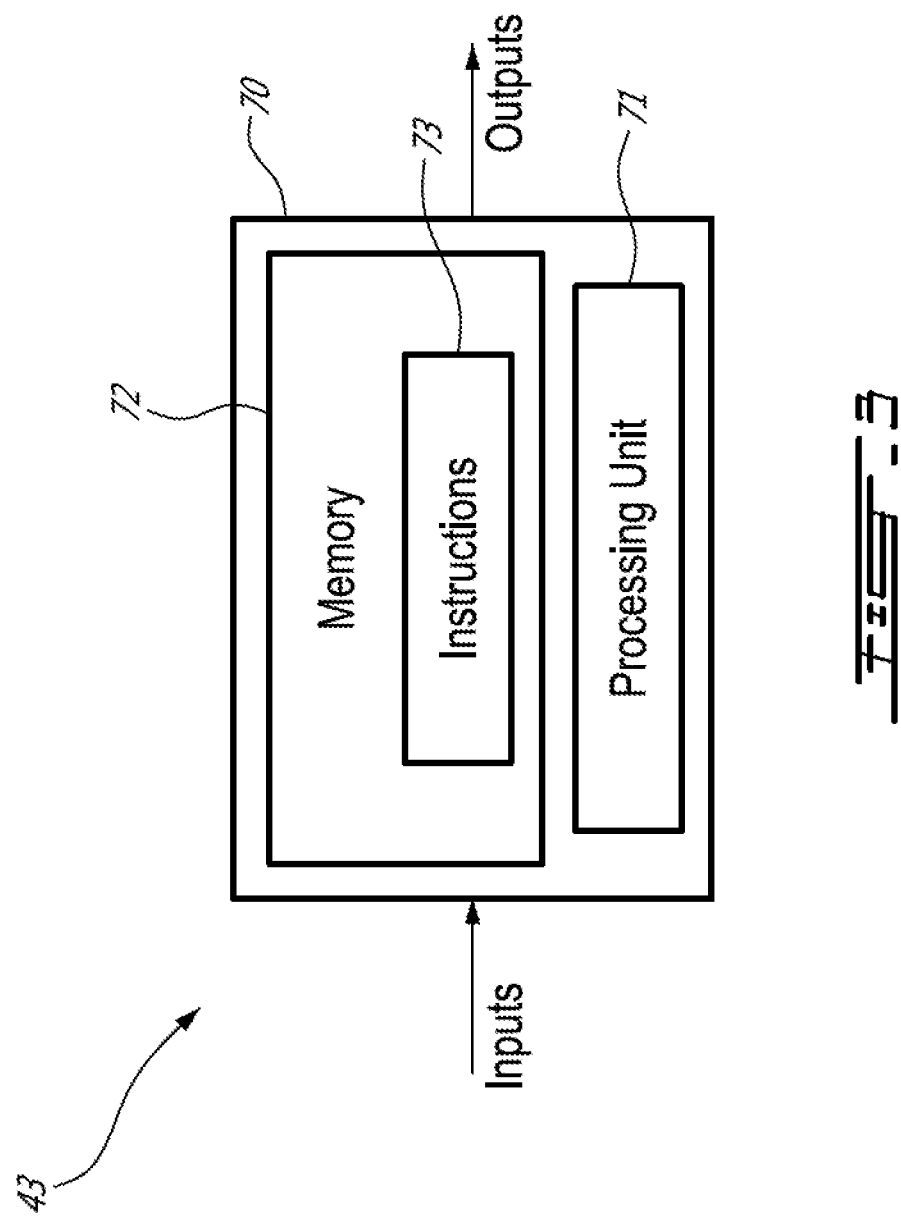
FIG. 3 is a block diagram of an exemplary controller of an electric power system of the multi-engine aircraft shown in FIG. 2.

Referring to FIG. 3, the controller 43 may be embodied, partly or entirely by a computing device 70. The computing device 70 comprises a processing unit 71 and a memory 72 which has stored therein computer-executable instructions 73. The processing unit 71 may comprise any suitable devices configured to implement the functionality of the controller 43 and/or the electric power system 40 described herein, such that instructions 73, when executed by the computing device 70 or other programmable apparatus, may cause the functions/acts/steps performed by the controller 43 and/or the electric power system 40 to be executed. The processing unit 71 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, custom-designed analog and/or digital circuits, or any combination thereof.

The memory 72 may comprise any suitable known or other machine-readable storage medium. The memory 72 may comprise non-transitory computer readable storage medium, for example, but not limited to, an electronic, magnetic, optical, electromagnetic, infrared, or semiconductor system, apparatus, or device, or any suitable combination of the foregoing. The memory 72 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 72 may comprise any storage means (e.g., devices) suitable for retrievably storing machine-readable instructions 73 executable by processing unit 71.

The methods and systems for distributing electric power in a multi-engine aircraft as described herein may be implemented in a high level procedural or object oriented programming or scripting language, or a combination thereof, to communicate with or assist in the operation of a computer system, for example the computing device 70. Alternatively, the methods and systems described herein may be implemented in assembly or machine language. The language may be a compiled or interpreted language.

Embodiments of the methods and systems described herein may also be considered to be implemented by way of a non-transitory computer-readable storage medium having a computer program stored thereon. The computer program may comprise computer-readable instructions which cause a computer, or more specifically the processing unit 71 of the computing device 70, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The electric power system 40 may be configured to supply enough electric power to the electrical motor 30 in order to produce some or all of the torque required to rotate the propeller 11 during at least one mode of operation of the aircraft.

However, there may be a need to provide supplementary electric power to the electric motor 30 or the battery pack 42. In some instances, such need may be caused by a failure of the battery pack 42, which may not supply enough (or not supply at all) electric power to the electric motor 30. A proper electric power distribution is thus required to alleviate this for the powerplant 10 and/or the multi-engine aircraft 1 as a whole. The electric power system 40 therefore includes a reserve battery pack 44 providing electric power to the electric motor 30 when the electric power system 40 detects a need for supplementary electric power to be supplied to the electric motor 30. Upon detecting such need, the electric power system 40 commands the reserve battery pack 44 to supply electric power to the electric motor 30 and/or the battery pack 42 associated with the electric motor 30. For sake of clarity the battery pack 42 will be referred to as the primary battery pack 42. Operation of the electric power system 40 is described below in the context of the multi-engines aircraft 1.

Referring to FIG. 2, the multi-engine aircraft 1 is schematically illustrated. The multi-engine aircraft 1 has two powerplants 10, which are, more particularly in this embodiment, two hybrid-electric powerplants 10A, however can also include more than two powerplants 10 in other embodiments, each including a combustion engine 10A' and an electric motor 30, where the combustion engine 10A' and the electric motor 30 are drivingly engaged to a common load, as discussed above. In the illustrated embodiment, the hybrid-electric powerplants 10A drive respective loads, which in this case are respective propellers 11. In other embodiments, the hybrid-electric powerplants 10A may be compounded and drive a common load, together with their respective electric motor 30 and combustion engine 10A'. In other embodiments, the loads may be other than propellers 11, for instance a fan of a turbine engine, or else in other embodiments. Although the depicted embodiment of the multi-engine aircraft 1 has hybrid-electric powerplants 10A only, the multi-engine aircraft 1 may have one or more of the powerplants 10 fully electric, meaning that one or more of the powerplants 10 may not have a combustion engine 10A' portion and include one or more electric motors 30 to drive a load in alternate embodiments. Such powerplants 10 would be referred to as electric powerplants. The multi-engine aircraft 1 may thus comprise two or more powerplants 10 from which one or more is/are hybrid-electric powerplant(s) 10A and one or more is/are electric powerplants in alternate embodiments.

As shown, the multi-engine aircraft 1 includes a fuel system 60. The fuel system 60 distributes the required fuel to power the combustion engine(s) 10A' of the multi-engine aircraft 1. The fuel system 60 may thus include one or more fuel reservoir(s), pump(s), piping and a fuel distribution controller(s). The fuel system 60 may be connected to the control interface 50 (discussed previously), but not operatively connected to the electric power system 40.

The electric power system 40 controls the electric distribution to the electric motors 30 and are operatively connected thereto. The electric power system 40 includes a primary battery pack 42 operatively connected to each of the electric motors 30. In other words, each electric motor 30 has a primary battery pack 42 operatively connected to it, such that the electric motors 30 have a respective primary battery pack 42 associated with each of them. In some embodiments, one or more electric motors 30 have more than one primary battery pack 42 associated therewith. It may be desirable to have electrical redundancy within the multi-engine aircraft 1 and powerplants 10, so that if the primary battery pack 42 associated with a given one of the electric motors 30 fails (e.g. fails to deliver sufficient amount of electric power to its associated electric motor 30 during operation of the powerplants 10), a power source reserve/back-up as described below may continue to supply a suitable amount of electric power to said electric motor 30.

The electric power system 40 includes a single reserve battery pack 44 operatively connected to a selected one of the electric motors 30 of the two (or more) powerplants 10. In other words, in the depicted embodiment, contrary to the primary battery packs 42 associated with respective ones of the electric motors 30, the reserve battery pack 44 may be operatively connected to more than one electric motor 30. That is, the reserve battery pack 44 of the electric power system 40 may supply electric power to one of the electric motors 30, which is selected once identified as having a need for electric power. This may occur, for instance, when the electric power system 40 detects a failure of the primary battery pack 42 associated with one of the electric motors 30. Such selection may be performed by components of the electric power system 40, such as the controller 43 discussed above, or other suitable components, such as an electrical switch (physical or software switch), for instance. The component(s), as for instance the switch, operatively connected to the electric motors 30 and the reserve battery pack 44 may provide access to electric power from the reserve battery pack 44 to the selected electric motor 30.

The reserve battery pack 44 may be selected to be capable of supplying sufficient amount of electric power to one of the electric motor 30 at a time, in any mode of operation of the powerplant(s) 10. In instances where the primary battery pack 42 that failed and associated with one of the electric motor 30 is unable to supply electric power (totally unable or unable to provide sufficient amount of electric power), the electric power system 40 may command the reserve battery pack 44 to supply the electric motor 30 in need for electric power. Such supply may be allowed via the selection component(s) interfacing between the electric motors 30 and the reserve battery pack 44 discussed above.

The reserve battery pack 44 may take different forms. In an embodiment, the reserve battery pack 44 is a non-rechargeable (or "single use") battery that must be changed once used, for instance. The reserve battery pack 44 may be a rechargeable one in other embodiments.

In the illustrated embodiment, the multi-engine aircraft 1 has a single reserve battery pack 44 operatively connected to the electric motors 30 of the two hybrid-electric powerplants 10A. This may minimize the overall weight of the multi-engine aircraft 1, as the amount of batteries and electrical redundancy is minimal. There is thus no need for duplicate components for forming the electric power system 40 and reserve power source of the multi-engine aircraft 1, which may advantageously reduce weight and/or simplify the electrical network forming the electric power system 40 of the multi-engine aircraft 1.

In the illustrated embodiment, the multi-engine aircraft 1 has a pair of hybrid-electric powerplants 10A, and the electric power system 40 has one reserve battery pack 44 per pair of primary battery packs 42 for providing electrical redundancy to the pair of hybrid-electric powerplants 10A. Although the multi-engine aircraft 1 shown has only one pair of powerplants 10, which is in this case one pair of hybrid-electric powerplants 10A, there may have more than one pair of powerplants 10/hybrid-electric powerplants 10A in alternate embodiments. In such instances, the electric power system 40 has one reserve battery pack 44 for each pair of powerplants 10, though as discussed above, the multi-engine aircraft 1 may have only a single reserve battery pack 44 no matter the number of powerplants 10 in the whole aircraft.

In an embodiment, one or more of the hybrid-electric powerplants 10A includes a rotary engine compounded with their combustion engine 10A'. The rotary engine may take different form, where in a particular embodiment the rotary engine is a Wankel rotary engine. The rotary engine, the combustion engine 10A' and the electric motor 30 of said one or more hybrid-electric powerplants 10A may be drivingly engaged to the common load via a gearbox (the RGB 12, or an additional gearbox mechanically coupling the combustion engine 10A', the electric motor 30, and the rotary engine). One or more of the hybrid-electric powerplants 10 may include more than one rotary engine, in some embodiments.

Methods of distributing electric power in a multi-engine aircraft having two or more powerplants (10, 10A) may be implemented by the features of the multi-engine aircraft 1, powerplants 10 and electric power systems 40, some embodiments of which described herein. In an embodiment, a method comprises detecting a need for supplementary electric power to be supplied to one of the electric motors 30, and responsive to detecting such need, commanding a reserve battery pack 44 to supply electrical power to said electric motor 30, for example via one or more components of the electric power system 40, such as the controller 43.

The above description is meant to be exemplary only, and one skilled in the relevant arts will recognize that changes may be made to the embodiments described without departing from the scope of the disclosure. Also, one skilled in the relevant arts will appreciate that while the systems, devices and turbine engines disclosed and shown herein may comprise a specific number of elements/components, the systems, devices and turbine engines could be modified to include additional or fewer of such elements/components. Modifications which fall within the scope of the present invention will be apparent to those skilled in the art, in light of a review of this disclosure, and such modifications are intended to fall within the appended claims.

The invention claimed is:

1. A multi-engine aircraft comprising:
a plurality of powerplants configured for providing motive power to the aircraft, each including an electric motor; and
an electric power system controlling electrical distribution and operatively connected to the electric motors, the electric power system including primary battery packs, each operatively connected to the electric motor of a respective one of the plurality of powerplants, the electric power system further including a reserve battery pack and a switch interconnecting the reserve battery pack and the electric motors, the reserve battery pack shared by the electric motors by the switch and configured such that, in a mode of operation where the electric motor of each of the plurality of powerplants provide motive power to the aircraft, the reserve battery pack provides electric power only to a selected one of the electric motors, wherein the reserve battery pack is sized to supply electric power to only one of the electric motors at a time in any mode of operation of the plurality of powerplants.

2. The multi-engine aircraft as defined in claim 1, wherein the reserve battery pack is a single-use battery.

3. The multi-engine aircraft as defined in claim 1, wherein at least one of the plurality of powerplants is a hybrid engine including a combustion engine and the electric motor.

4. The multi-engine aircraft as defined in claim 3, wherein the combustion engine is a gas turbine engine.

5. The multi-engine aircraft as defined in claim 3, wherein the combustion engine and the electric motor of said powerplant are drivingly engaged to a common load.

6. The multi-engine aircraft as defined in claim 1, wherein the plurality of powerplants is a pair of powerplants and the reserve battery pack of the electric power system is only one reserve battery pack per pair of primary battery packs for providing electrical redundancy to the pair of powerplants.

7. The multi-engine aircraft as defined in claim 1, wherein the reserve battery pack is a single reserve battery pack of the electric power system and is operatively connected to the electric motors.

8. The multi-engine powerplant system as defined in claim 1, wherein the plurality of powerplants is two hybrid-electric powerplants, the two hybrid-electric powerplants having two combustion engines and two electric motors each associated with a respective one of the combustion engines, each paired electric motor and combustion engine drivingly engaged to a respective common load, wherein the reserve batter pack of the electric power system is a single reserve battery pack operatively connected to the two electric motors via the switch.

9. The multi-engine aircraft as defined in claim 1, further comprising a motor drive coupled to a given one of the electric motors, the motor drive operatively interfacing with the given one of the electric motors and the primary battery pack associated with said one of the electric motors.

10. The multi-engine powerplant system as defined in claim 5, further comprising a gearbox, the electric motor and the combustion engine of said powerplant drivingly engaged to the gearbox to drive the common load.

11. The multi-engine aircraft as defined in claim 1, wherein the plurality of powerplants each drive a respective load including a propeller.

12. The multi-engine aircraft as defined in claim 1, wherein at least one of the plurality of powerplants includes a combustion engine and a rotary engine compounded with the combustion engine of said powerplant, the combustion engine being a gas turbine engine, and wherein the rotary engine, the gas turbine engine and the electric motor of said powerplant are drivingly engaged to a common load via a gearbox.

13. The multi-engine aircraft as defined in claim 1, wherein the multi-engine aircraft includes a generator operatively connected to at least one of the primary battery packs.

14. The multi-engine aircraft as defined in claim 13, wherein at least one of the plurality of powerplants includes a combustion engine, the generator is operatively connected to the combustion engine, such that power generated by the combustion engine is supplied to the generator for charging the at least one of the primary battery packs.

15. The multi-engine aircraft as defined in claim 1, wherein at least one of the plurality of powerplants has a plurality of electric motors, each of the electric motors of said powerplant has a respective primary battery pack operatively connected thereto.

16. The multi-engine aircraft as defined in claim 1, further comprising an auxiliary power unit for providing a source of electric power to the aircraft or a pneumatic power for cabin air inside the aircraft.

* * * * *